(12) United States Patent
Kumar

(10) Patent No.: US 7,720,877 B1
(45) Date of Patent: May 18, 2010

(54) CLASS STRUCTURE BASED ENHANCER FOR DATA OBJECTS

(75) Inventor: Ajay Kumar, Bangalore (IN)

(73) Assignee: Oracle America, Inc., Redwood Shores, CA (US)

( * ) Notice: Subject to any disclaimer, the term of this patent is extended or adjusted under 35 U.S.C. 154(b) by 1460 days.

(21) Appl. No.: 10/824,092

(22) Filed: Apr. 14, 2004

(51) Int. Cl.
*G06F 7/00* (2006.01)

(52) U.S. Cl. ................................ 707/803; 707/804

(58) Field of Classification Search ......... 707/100–102, 707/104.1, 204
See application file for complete search history.

(56) References Cited

U.S. PATENT DOCUMENTS

| | | | |
|---|---|---|---|
| 6,339,782 B1* | 1/2002 | Gerard et al. | 718/1 |
| 6,470,494 B1* | 10/2002 | Chan et al. | 717/166 |
| 6,633,892 B1* | 10/2003 | Chan et al. | 707/204 |
| 6,766,324 B2* | 7/2004 | Carlson et al. | 707/10 |
| 6,925,638 B1* | 8/2005 | Koved et al. | 717/155 |
| 7,080,363 B2* | 7/2006 | Yellin et al. | 717/139 |
| 2002/0120859 A1* | 8/2002 | Lipkin et al. | 713/200 |
| 2003/0051229 A1* | 3/2003 | Boyle | 717/116 |
| 2003/0149934 A1* | 8/2003 | Worden | 715/513 |
| 2003/0182292 A1* | 9/2003 | Leong et al. | 707/100 |
| 2003/0229605 A1* | 12/2003 | Herrera et al. | 706/47 |
| 2004/0044687 A1* | 3/2004 | Vachuska et al. | 707/104.1 |
| 2004/0107291 A1* | 6/2004 | Gamo | 709/232 |
| 2004/0123048 A1* | 6/2004 | Mullins et al. | 711/141 |
| 2005/0071342 A1* | 3/2005 | Calusinski | 707/100 |

OTHER PUBLICATIONS

"Building a persistent object store using the java reflection API" Arthur Lee et al. Jan. 14, 2004.*
Chapter 3 "Getting Started with JDO" ), p. 45-88, Jul. 22, 2003, (hereafter Sameer), http://www.informit.com/content/images/0131407317/samplechapter/0131407317_ch03.pdf.*
"Package com.arsdigita.persistence.metadata," http://rhea.redhat.com/doc/waf/6.0/api/com/arsdigita/persistence/metadata/package-summa..., Red Hat, Inc. Corporation, Aug. 18, 2003, (2 pages).
Bobzin, et al., "Getting Started with JDO," http://www.phptr.com/articles/printerfriendly.asp?p=169515, Feb. 27, 2004, (33 pages).

* cited by examiner

*Primary Examiner*—Etienne P LeRoux
*Assistant Examiner*—Cindy Nguyen
(74) *Attorney, Agent, or Firm*—Robert C Kowert; Meyertons, Hood, Kivlin, Kowert & Goetzel, P.C.

(57) ABSTRACT

Various embodiments of a system and method for enhancing applications for Java Data Object (JDO) persistence are disclosed. A class structure based data object enhancer may operate on the classes of an application in the absence of user input, to produce metadata to determine a persistence structure corresponding to the application classes. The class structure based data object enhancer may use the generated metadata to produce enhanced application classes. For example, the class structure based data object enhancer may incorporate calls to a JDO persistence mechanism into a class at each point where a field designated by the persistence structure to be persisted, is accessed. The class structure based data object enhancer may also generate a database schema, which may specify how the fields designated for persistence are stored in a persistent data store.

39 Claims, 7 Drawing Sheets

CLASS STRUCTURE BASED ENHANCER FOR DATA OBJECTS

BACKGROUND

1. Field of the Invention

This invention relates to computer systems, and more particularly to the enhancement of classes for data object persistence.

2. Description of the Related Art

Applications are often implemented as part of commercial and non-commercial business solutions for an enterprise. In some instances it is desirable that the data operated on and generated by an application be persisted to a persistent data store in order that subsequent invocations of the application may have access to the persistent data. One situation in which data persistence is beneficial is in the area of failure recovery. If an application server fails, information for the applications running in that server may be lost. Subsequent to the application server failure, the applications that it was running at the time of failure may be invoked on another server to take the place of those running on the failed server. If the application data were persisted to a persistent data store remote from the failed server and available to the newly invoked instances of the failed applications, processing could be resumed at the point of application server failure.

Typically, application state persistence is achieved through serialization. Serialization allows an object graph to be serialized into a stream, which can be associated with a file. The entire graph of objects reachable from the instance in then serialized into the stream. Serialization lacks features that may be desirable for distributed application systems. For example, there is no support for transactions. Without concurrency control, there is nothing to prevent multiple application component instances from serializing to the same file, thus corrupting state data. Serialization also lacks the ability to perform queries against the data. The granularity of access is an entire object graph, making it impossible to access a single instance or subset of the serialized data. Serialization includes no mechanism to determine when persistence updates should be performed. It therefore falls to the application developer to code the invocation points for serialization. Typically, this is done upon each request and results in large and for the most part unnecessary transfers of data among cluster members. Serialization can be a very time consuming operation.

An alternative to serialization is Java Data Object (JDO) persistence. In JDO persistence the classes of an application are enhanced such that each data field to be persisted is identified. Further, class enhancement provides calls to persistence mechanisms included in the JDO runtime environment when a data field to be persisted is accessed. This level of class enhancement allows for a granularity of persistence such that a single data field may be persisted. In addition, JDO persistence mechanisms can store persisted data objects to a persistent store such as a database according to an appropriate database schema. For example, with an application structure based schema, there may be a database table corresponding to each class of the application and the fields of a given class may be persisted to the table corresponding to that class. In another instance persisted fields of all application classes may be stored in a single table in the persistent store.

The basis for JDO enhancement of application classes is user-provided metadata input. Metadata is usually supplied by a user to the JDO enhancer in the form of a metadata file. The exact format of this file is specified by the provider of the JDO runtime environment, and in general it includes information on the names and types of variables included in classes, the names of classes and superclasses included in an application, and information on the data store to which the class data fields are to be persisted.

Typically, the application architect, coders, and one or more persons intimately familiar with the characteristics of the persistent data store are compelled to refer to the metadata file specification supplied by the JDO runtime environment vendor and laboriously input data indicating which data fields from each class need to be persisted, the structural relationship of these fields to their classes and to one another, and how the fields are to be stored in the persistent store.

SUMMARY

Various embodiments of a system and method for enhancing applications for data object persistence are disclosed. A class structure based data object enhancer may operate on the classes of an application in the absence of user input, to produce metadata to determine a persistence structure corresponding to the application classes. The class structure based data object enhancer may use the generated metadata to produce enhanced application classes. For example, the class structure based data object enhancer may incorporate calls to a JDO persistence mechanism into a class at each point where a field designated by the persistence structure to be persisted, is accessed. The class structure based data object enhancer may also generate a database schema, which may specify how the fields designated for persistence are stored in a persistent data store.

The classes, which are input to the class structure based data object enhancer may, in some embodiments be compiled and included in a Java archive (JAR) file. In order to produce the metadata, the class structure based data object enhancer may analyze the structure of each class included in an application to determine the names and types of data fields included in the class, the name of the class, the name of the package in which the class is included, superclasses of the given class, as well as other class attributes. The class structure based data object enhancer may make Java reflection calls to the application classes and/or parse the bytecode of the classes in order to elicit the required information for generating the metadata. This information may be augmented by one or more assumptions/default rules included in the class structure based data object enhancer to produce the necessary metadata. In some embodiments the metadata may be used to produce an explicit metadata file, which is subsequently used to enhance the application classes. In other embodiments, the generated metadata may be used to enhance the application classes as it is generated and may not be output in an explicit metadata file.

The persistence structure may include the application class fields to be persisted along with indications of how the fields are to be stored in the persistent data store. One of the default rules included in the class structure based data object enhancer may be that all fields in a class should be persisted unless they are declared to be constant or transient. Following this assumption the class structure based data object enhancer may readily generate a list of application class fields to be persisted and produce the corresponding metadata. Another default rule may be to store the persistent fields of a given class in a table corresponding to that particular class in a database. For example, if an application includes classes A, B, and C, the corresponding persistence structure may indicate that a database schema be followed to store the persistent fields of class A in a corresponding table A in the database, the persistent fields of class B in a corresponding table B in the database, and likewise, the persistent field of class C in a corresponding table C in the persistent database. In another embodiment, a default rule may be included in the class structure based data object enhancer to store the persistent fields of an application in a single table in the persistent database.

In some embodiments, the class structure based data object enhancer may also accept metadata input from the user. This user-input metadata may be used to override or supplement the assumptions/default rules included in the class structure based data object enhancer. For example, the user-input metadata may indicate that certain data fields determined to be persisted according to a default rule, should not be persisted. In another case, the user-input metadata may cause the class structure based data object enhancer to persist all persistent application data fields in a single table within a persistent database contrary to a default rule that would persist persistent data fields of application classes in separate tables corresponding to the classes.

The class structure based data object enhancer may output the enhanced classes for an application in compiled form. In some embodiments, the enhanced, compiled classes may be included in a JAR file. When desired, the class structure based data object enhancer may also provide a database schema and/or a metadata filet as output. In some embodiments a metadata file may be used by the persistence mechanisms of the JDO runtime environment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
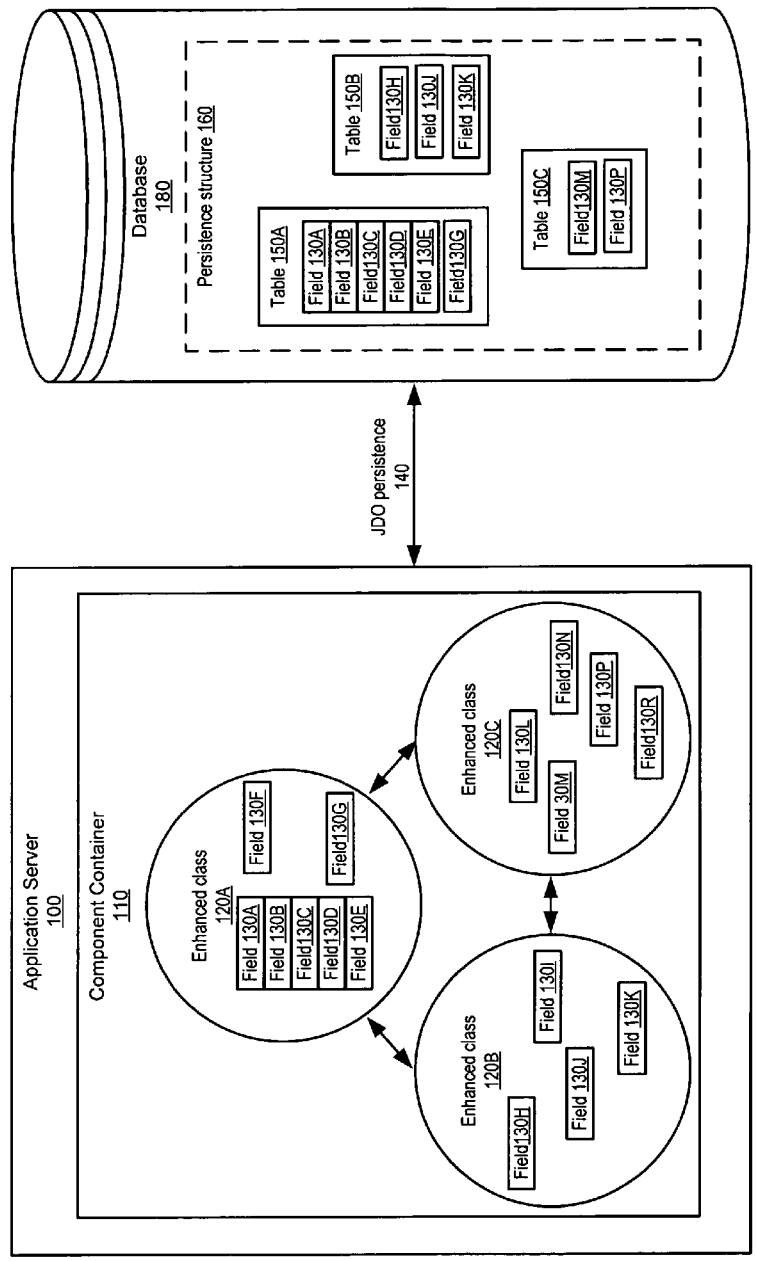
FIG. 1 illustrates the classes of an application enhanced for persistence by a class structure based JDO enhancer and the associated persistence structure, according to one embodiment.

FIG. 1 illustrates the classes 120 of an application enhanced for persistence by a class structure based JDO enhancer and the associated persistence structure 160, according to one embodiment. In one embodiment, application server 100 may be included in one tier of tiered application architecture. Tiers (e.g., client tier, middle tier, backend tier) may represent the logical or physical organization of application components, which may operate across one or more different computers. The different computers may be based on different platforms and architectures. For example, the application components of the computer system may be based on a three-tier architecture.

In one embodiment, the client tier may include a number of different clients (e.g., device, system, user interface) communicating to application components (e.g., enhanced classes 120) in the middle tier via a network such as the Internet. The middle tier may include a number of different application servers 100. In some embodiments, an application server 100 may include functionality typically provided by a Web server. In other embodiments, application server 100 may include a transactional application to allow a corporation to conduct E-commerce. The backend tier may include a number of different computer systems including enterprise information systems that may store a corporation's data resources such as database 180.

Application components may communicate using different types of protocols and technologies such as Hyper Text Transfer Protocol Secure sockets (HTTPS), Java™ Database Connectivity (JDBC), Java Naming and Database Interface (JNDI), eXtensible Markup Language (XML) and/or Simple Object Access Protocol (SOAP). The application components within a tier typically communicate with remote application components in an adjacent tier. For example, multiple users with access to an application component configured to operate in a client tier (e.g., application client accessible via a Web browser) may initiate requests (e.g., application program call) to each remote application component configured to operate in the middle tier. Each application component in the middle tier may, in turn, initiate requests to the backend tier on behalf of the application component in the client tier. For example, an application component in the middle tier may receive a remote request from a Web browser operating in the client tier and in response access an application component (e.g., database object) operating in the backend tier. The application component in the backend tier may then provide a response to the application component in middle tier, which may complete the remote request.

Some of the application components operating within the middle tier may be configured to run within a component container 110 provided with an application server 100. Some standard services (e.g., security, transaction management, state management, multi-threading, and persistence) may be built into a platform and provided automatically to the application components via the container 110 and/or application server 100. The component container 110, for example, may be configured to provide persistence capability to application components running within the component container. For example, component container 110 may provide a Java Data Object (JDO) interface that application components 120 may use to access the persistence services.

A class structure based JDO enhancer may extract metadata from an application and use this metadata along with assumptions or default rules to produce application classes 120 enhanced for persistence to data store 180. The metadata may indicate which of data fields 130 are to be persisted. For example, in the case of class 120A the class structure based JDO enhancer may determine that the array including fields 130A-E and field 130G should be persisted. The class structure based JDO enhancer may enhance class 120A such that access to the identified fields produces one or more calls to JDO persistence services. A JDO persistence call 140 may modify the value of a persisted field in database 180 corresponding to the class field being modified in the application. JDO persistence may insure that the fields stored in database 180 constantly reflect the values of their corresponding fields in the application without the need to store the values of all fields of a class when any field value changes.

The class structure based JDO enhancer may also generate persistence structure 160 and/or a database schema for storing persistent class fields in database 180. In some embodiments, the generated metadata and/or default rules of the class structure based JDO enhancer may indicate that the persistent fields of the enhanced application classes 120 should be stored in database 180 in tables corresponding to each class. For example, the persisted fields of enhanced class 120A, fields 130A-E and G, are persisted in table 150A within database 180. Likewise, the persisted fields of enhanced class 120B, fields 130H, J, and K, are persisted in table 150B and the persisted fields of enhanced class 120C, fields 130M and P, are persisted in table 150C. In other embodiments of a class structure based JDO enhancer, a default rule may be included to store all persisted values of an application in a single table.

Figure 2:
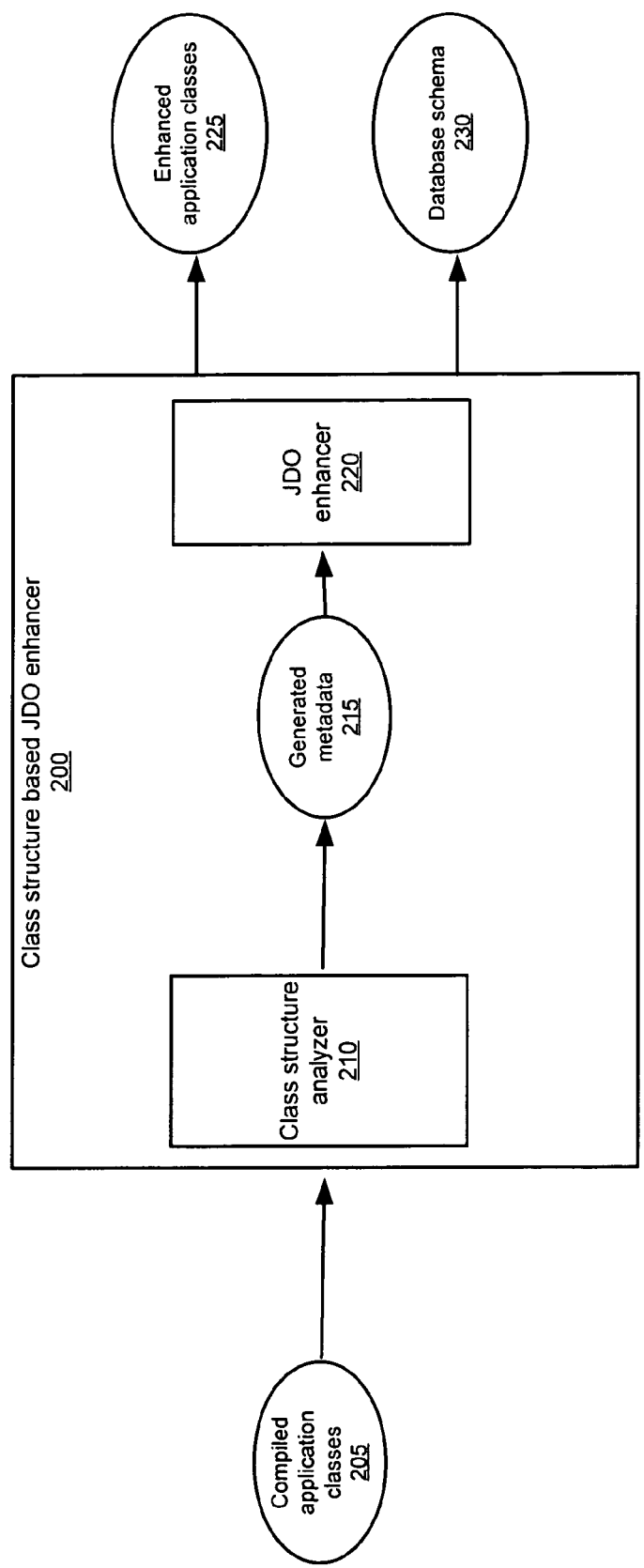
FIG. 2 illustrates the components of a class structure based JDO enhancer, according to one embodiment.

FIG. 2 illustrates the components of a class structure based JDO enhancer 200, according to one embodiment. Class structure based JDO enhancer 200 may operate on compiled application classes 205 to produce enhanced application classes 225 capable of JDO persistence along with database schema 230. Class structure analyzer 210 may input compiled application classes 205 and use Java reflection and/or bytecode parsing along with a set of assumptions or default rules to determine attributes of the structure of the classes at various levels.

At the class level, the class structure analyzer 210 may determine the name of the class to be persisted along with the name of any persistence-capable superclass. The class structure analyzer 210 may also determine the identity type, specifying whether objects are uniquely identified by the JDO implementation (data store identity), accessible fields in the object (application identity), or not at all (non-durable identity). When using application identity the class structure analyzer 210 may determine the class name of the primary key. In some embodiments, the class structure analyzer 210 may determine whether the JDO implementation must provide an Extent for this class. An Extent may allow an application to iterate to every persistent instance of the class.

At the field level, the class structure analyzer 210 may determine the name of each field, whether it is to be persisted, and whether the field is part of any primary key (if using application identity). In some embodiments, the class structure analyzer 210 may determine how to treat null values of persistent fields during storage, for example null values may be treated as the default, an exception, etc. The class structure analyzer 210 may also determine whether a field should be stored, if possible, as part of the object instead as its own object in the data store and whether this field is part of the default fetch group for the class.

At the array or collection level, the class structure analyzer 210 may determine both the type of element stored in the array or collection and whether the elements of the collection or array-valued persistent field should be stored as embedded or first-class objects. At the map level, the class structure analyzer 210 may determine for a key-type map the type of key stored in the Map along with whether the elements of the Map key field should be stored embedded or as first-class objects. For a value-type map, the class structure analyzer 210 may determine the type of value stored in the Map along with whether the elements of the Map value field should be stored embedded or as first-class objects.

These various levels of application class structural data or metadata, may be used to determine a persistence structure for the compiled application classes 205. A persistence structure may be an accounting of the objects to be persisted from the compiled application classes 205 along with a template for storing the objects in a data store. The template for storing the objects in a data store may be a database schema 230.

Figure 3:
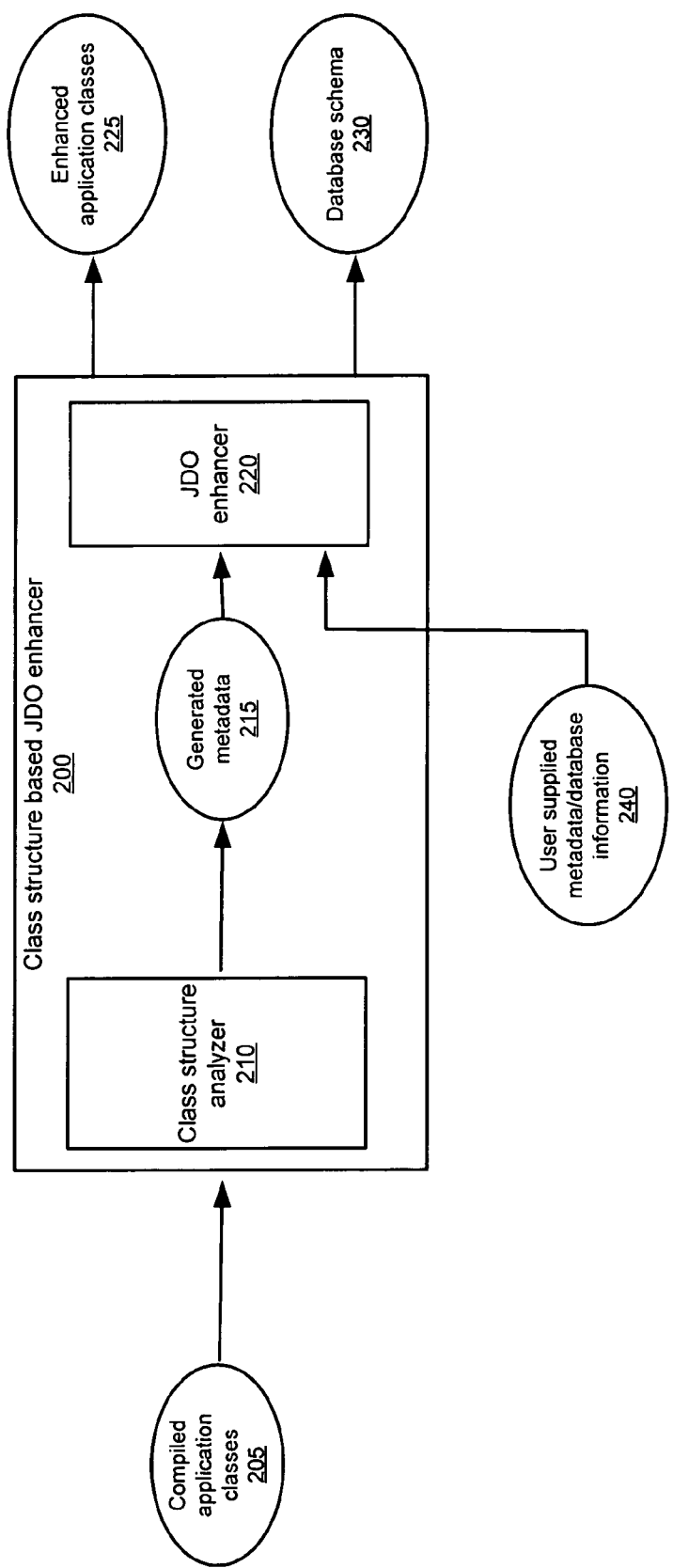
FIG. 3 illustrates the augmentation of generated metadata by user supplied metadata and/or database information, according to one embodiment.

FIG. 3 illustrates the augmentation of generated metadata 215 by user supplied metadata and/or database information 240, according to one embodiment. In some embodiments, it may be desirable to override or supplement one or more elements of the generated metadata 215. The class structure analyzer 210 may make certain assumptions about the desired method for storing persisted objects in a database. If the user desires to store the persisted objects according to a schema different from that which the class structure analyzer 210 assumes as the default, user supplied metadata/database information 240 may be provided to JDO enhancer 220 along with generated metadata 215 to override the assumptions of class structure analyzer 210.

For example, JDO enhancer 220 may as a default generate a database schema 230 which specifies that persisted objects in a class be stored in a table corresponding to that class. The user may desire that all persisted objects be stored in a single table and may be able to input user supplied metadata/database information 240 to JDO enhancer 220 to override the default and produce the desired database schema 230. As another example, JDO enhancer 220 may assume that all fields in the classes that are not defined as static or transient are to be persisted. A user may desire to persist fewer than all of these fields in order to reduce database storage requirements and once again may input metadata to JDO enhancer 220 to specify the fields to be persisted.

Figure 4:
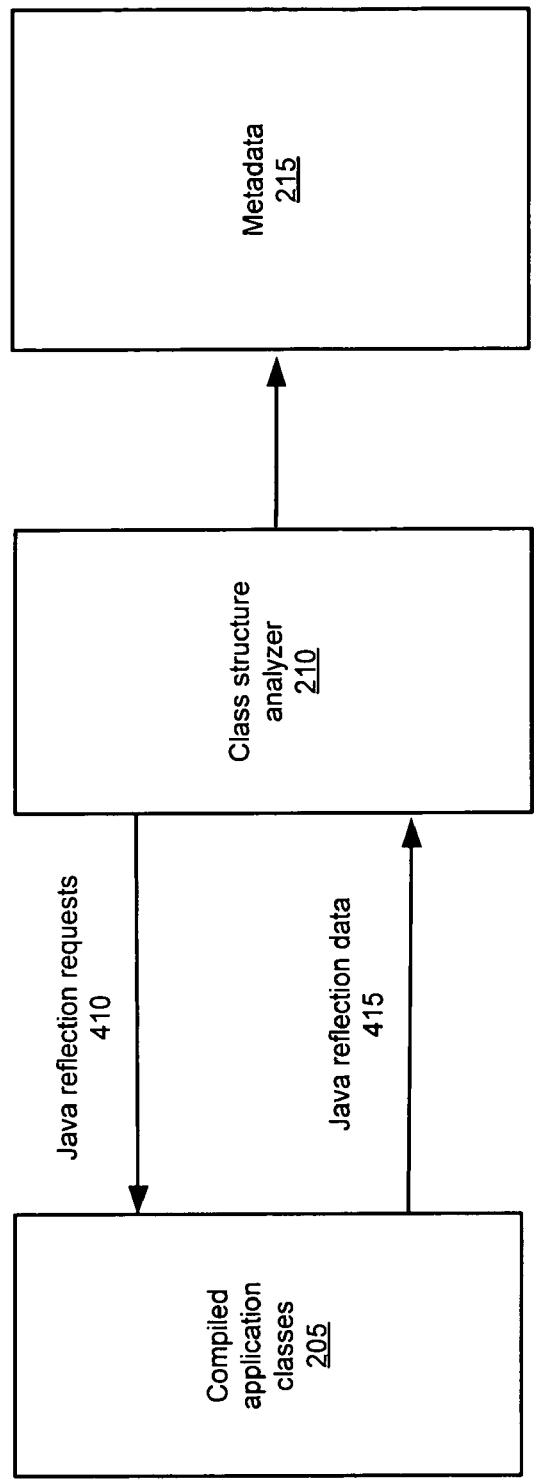
FIG. 4 illustrates the use of Java reflection in determining metadata for JDO persistence, according to one embodiment.

FIG. 4 illustrates the use of Java reflection in determining metadata for JDO persistence, according to one embodiment. Class structure analyzer 210 may use the methods of the class named Class to load or get the name of a class as a string object. Class structure analyzer 210 may also use the reflection API to make Java reflection requests 410 to the compiled application classes 205. The returned Java reflection data 415 may include information on the fields, methods, constructors, superclasses, interfaces, package, and declared classes associated with a class. Class structure analyzer 210 may use the information returned from Java reflection calls to produce the metadata 215 required to enhance the classes for JDO persistence.

In some embodiments, class structure analyzer 210 may generate metadata 215 in the form of an Extensible Markup Language (XML) file. The XML document may conform to a JDO Document Type Definition (DTD) for metadata. The following is an example of a JDO DTD for metadata:

<?xml version="1.0"?>

<!ELEMENT jdo (package)+>

<!ELEMENT package ((class)+, (extension)*)>

<!ATTLIST package name CDATA #REQUIRED>

<!ELEMENT class (field|extension)*>

<!ATTLIST class name CDATA #REQUIRED>

```
<!ATTLIST class identity-type (application|datastore|none)
    'datastore'>
<!ATTLIST class objectid-class CDATA #IMPLIED>
<!ATTLIST class requires-extent (true|false) 'true'>
<!ATTLIST class persistence-capable-superclass CDATA
    #IMPLIED>
<!ELEMENT field ((collection|map|array)?, (extension)*)>
<!ATTLIST field name CDATA #REQUIRED>
<!ATTLIST field persistence-modifier
    (persistent|transactional|none) 'persistent'>
<!ATTLIST field primary-key (true|false) 'false'>
<!ATTLIST field null-value (exception|default|none)
    'none'>
<!ATTLIST field default-fetch-group (true|false)
    #IMPLIED>
<!ATTLIST field embedded (true|false) #IMPLIED>
<!ELEMENT array (extension)*>
<!ATTLIST array embedded-element (true|false)
    #IMPLIED>
<!ELEMENT collection (extension)*>
<!ATTLIST collection element-type CDATA #IMPLIED>
<!ATTLIST collection embedded-element (true|false)
    #IMPLIED>
<!ELEMENT map (extension)*>
<!ATTLIST map key-type CDATA #IMPLIED>
<!ATTLIST map embedded-key (true|false) #IMPLIED>
<!ATTLIST map value-type CDATA #IMPLIED>
<!ATTLIST map embedded-value (true|false) #IMPLIED>
<!ELEMENT extension (extension)*>
<!ATTLIST extension vendor-name CDATA #REQUIRED>
<!ATTLIST extension key CDATA #IMPLIED>
<!ATTLIST extension value CDATA #IMPLIED>
```

Package, class, field, and array information obtained by the class structure analyzer through Java reflection calls may be used to produce the metadata entries in the corresponding element and attribute list positions in the XML metadata file. This metadata may be input into JDO enhancer 220. A JDO enhancer may use the information included in the XML metadata file along with a set of assumptions to enhance the compiled application classes 205 for JDO persistence.

Figure 5:
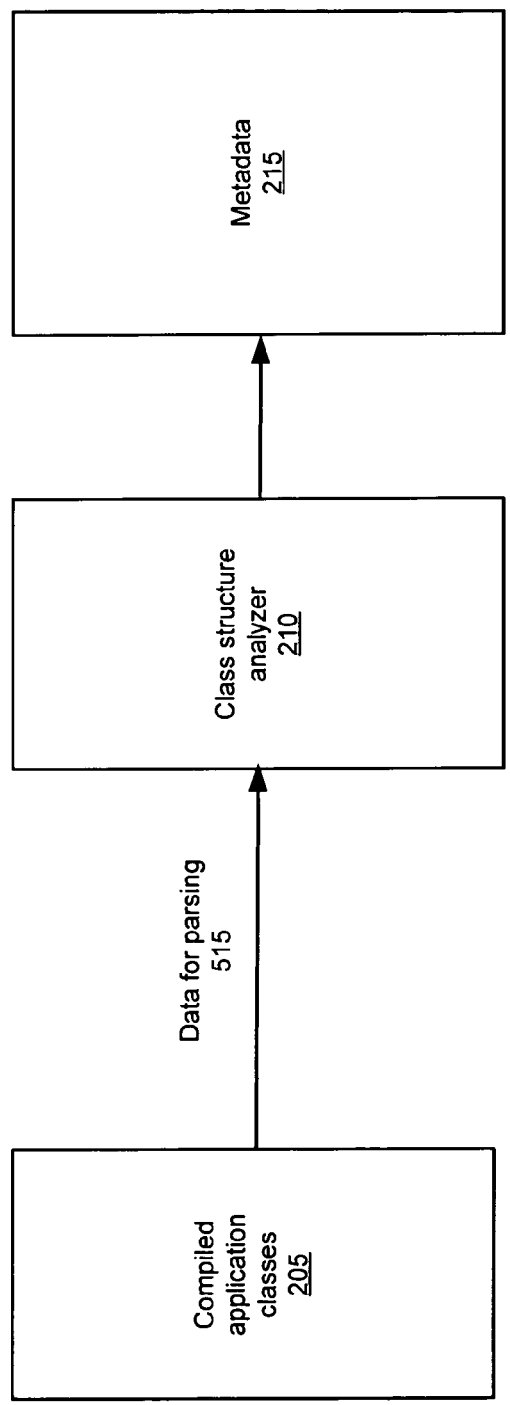
FIG. 5 illustrates the use of bytecode parsing in determining metadata for JDO persistence, according to one embodiment.

FIG. 5 illustrates the use of bytecode parsing in determining metadata for JDO persistence, according to one embodiment. The format of a Java class file may be specified sufficiently that a bytecode parser may extract any desired structural information from compiled application classes 205. For example, fields declared within a class may be grouped into a fields table with a specified position within the class file. In some embodiments, class structure analyzer 210 may operate on data for parsing 515 to extract required structural information from compiled application classes 205.

As in the case of Java reflection, the class structure analyzer 210 may use the information obtained from compiled application classes 205 to generate metadata 215 needed by the JDO enhancer to produce classes enhanced for persistence. The following is an example of an XML metadata file including exemplary metadata:

```
<?xml version="1.0"?>
<jdo>
    <package name="org.mag">
        <class name="Magazine" objectid-
            class="Magazine$ObjectId">
            <field name="isbn" primary-key="true"/>
            <field name="title" primary-key="true"/>
            <field name="articles">
                <collection element-type="Article"/>
            <field>
        <class>
        <class name="Article">
            <field name="authors">
                <map key-type="String" value-type="Author"/>
            </field>
        </class>
        <class name="Author">
            <field name="address" embedded="true"/>
        </class>
        <class name="Address"/>
    </package>
    <package name="org.mag.subscribe">
        <class name="Form"/>
        <class name="SubscriptionForm" persistence-capable-
            superclass="Form">
            <field name="lineItems">
                <collection element-
                    type="SubscriptionForm$LineItem"/>
            <field>
        <class>
        <class name="SubscriptionForm$LineItem"/>
    <package>
</jdo>
```

As in the case where the class structure analyzer 210 extracts needed information from compiled application classes 205 through Java reflection, a JDO enhancer may use the generated XML metadata file 215 along with a set of assumptions to enhance the compiled application classes 205 for JDO persistence. In some embodiments, the class structure analyzer 210 may use both Java reflection and bytecode parsing to obtain structural information from compiled application classes 205.

In some embodiments, class structure analyzer 210 may generate a metadata file that does not conform to the XML JDO DTD, or the generated metadata file may be of a file type different from XML. In other embodiments, metadata may not explicitly be captured in a file. In such a case, the class structure analyzer 210 may obtain structural information from the compiled application classes corresponding to a single object and generate the appropriate metadata for that object. The JDO enhancer may use this information to enhance the object's class for the JDO persistence of that object. Incremental enhancement of compiled application classes 205 may obviate the need for the generation of an explicit metadata file 215.

Figure 6:
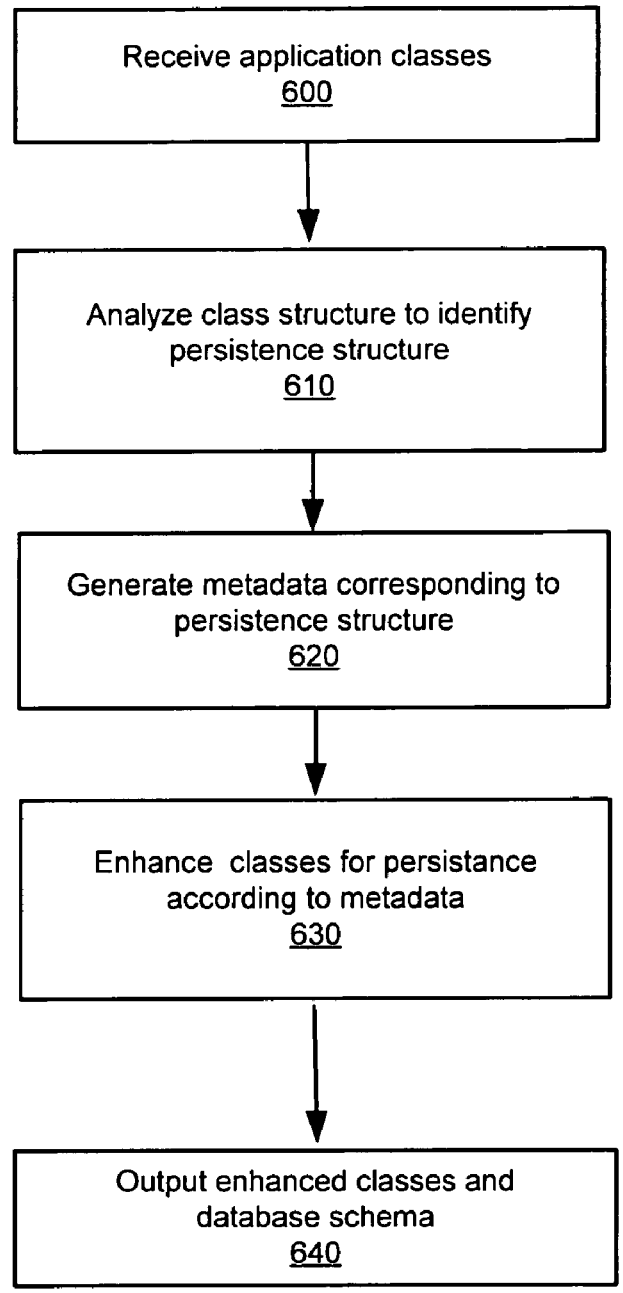
FIG. 6 is a flowchart of a method for operating a class structure based JDO enhancer, according to one embodiment.

FIG. 6 is a flowchart of a method for operating a class structure based JDO enhancer, according to one embodiment. At block 600, compiled application classes may be input into the class structure based JDO enhancer. In some embodiments, the compiled classes may be included in a Java archive (JAR) file while in other embodiments mapping information may be input into the class structure based JDO enhancer indicating the locations of the compiled classes according to a directory structure.

As shown in block 610, the class structure based JDO enhancer may analyze the input compiled application classes to determine an associated persistence structure. The persistence structure may include the fields to be persisted along with rules for how the persisted fields are to be configured in persistent storage. The class structure based JDO enhancer may use Java reflection calls to the classes and/or byte parsing of the classes along with default rules to determine the fields of the classes to include in the persistence structure.

For example, the class structure based JDO enhancer may use as a default rule that any field not explicitly marked as transient or static should be persisted. In the case of an application including classes A, B, and C, analysis of the classes may determine that there are three fields to be persisted from class A, five fields to be persisted from class B, and two fields to be persisted from class C. At block 620, metadata may be generated indicating the fields to be persisted and the scheme for their persistent storage. In one embodiment, the metadata may indicate that three tables should be allocated in the database corresponding to classes A, B, and C that include three, five, and two entries respectively for the field data. In other embodiments, a default rule for the structure based JDO enhancer may generate metadata that directs that all ten fields to be persisted be stored in a single table within the persistent store.

In some embodiments, the metadata generated by the structure based JDO enhancer through Java reflection, bytecode parsing, and default rules may be compiled in the form of a metadata file. As previously described, this metadata file may take the form of an XML document conforming to the JDO DTD in some embodiments, while in others the metadata file may be of a type different from XML. In still other embodiments, a metadata file may not be explicitly generated, but the generated metadata may be used on the fly by the structure based JDO enhancer to enhance the compiled application classes.

At block 630, the structure based JDO enhancer may use the generated metadata along with any user-supplied metadata to enhance the compiled application classes. In some embodiments, any method that accesses a field that the metadata indicates is to be persisted may be enhanced by the addition of one or more calls to the JDO runtime. For example, a method that writes to a persisted field may be enhanced with a runtime call that stores the new value of the field in the persistence data store.

In some embodiments, a metadata file may be needed at runtime by the JDO environment. In these cases, the generated metadata may be written into an explicit metadata file according to one of the formats described above. The output of the structure based JDO enhancer may include the metadata file, the enhanced application classes, and a database schema, if requested, as shown in block 640.

Figure 7:
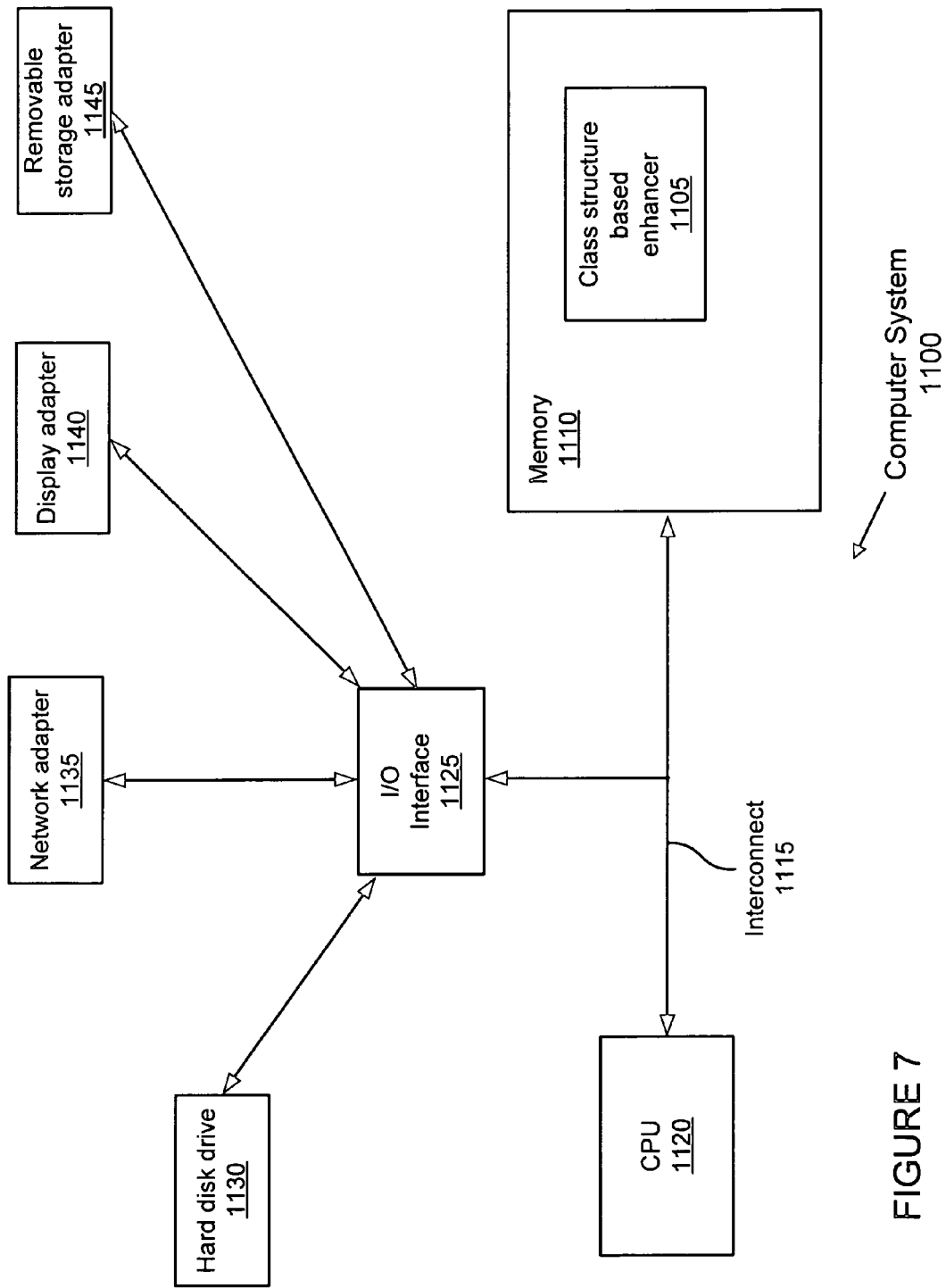
FIG. 7 illustrates an exemplary computer system that may include one embodiment of a class structure based JDO enhancer.

FIG. 7 illustrates one embodiment of a computer system 1100 that may include a class structure based JDO enhancer 1105 as described herein. Computer system 1100 may include many different components such as memory 1110, a central processing unit (CPU) or processor 1120, and an input/output (I/O) interface 1125. Interconnect 1115 is relied upon to communicate data from one component to another. For example, interconnect 1115 may be a point-to-point interconnect, a shared bus, a combination of point-to-point interconnects and one or more buses, and/or a bus hierarchy including a system bus, CPU bus, memory bus and I/O buses such as a peripheral component interconnect (PCI) bus.

The computer system 1100 preferably includes a memory medium on which computer programs according to various embodiments may be stored. The term "memory medium may include an installation medium, e.g., a CD-ROM, or floppy disk; a computer system memory such as DRAM, SRAM, EDO DRAM, SDRAM, DDR SDRAM, Rambus RAM, etc., or a non-volatile memory such as a magnetic media, e.g., a hard drive 1130, or optical storage. The memory medium may include other types of memory as well, or combinations thereof. In addition, the memory medium may be located in a first computer in which the programs are executed, or may be located in a second different computer, which connects to the first computer over a network. In the latter instance, the second computer provides the program instructions to the first computer for execution.

Also, the computer system 1100 may take various forms, including a personal computer system, mainframe computer system, workstation, network appliance, Internet appliance, personal digital assistant (PDA), television system or other device. In general, the term "computer system" can be broadly defined to encompass any device having a processor, which executes instructions from a memory medium. The memory medium preferably stores a software program or programs for event-triggered transaction processing as described herein. The software program(s) may be implemented in any of various ways, including procedure-based techniques, component-based techniques, and/or object-oriented techniques, among others. For example, the software program may be implemented using ActiveX controls, C++ objects, JavaBeans, Microsoft Foundation Classes (MFC), or other technologies or methodologies, as desired.

Memory 1110 may store program instructions accessed by the CPU 1120. For example, instructions and data implementing a class structure based JDO enhancer 1105 may be stored in memory 1110. Class structure based JDO enhancer 1105 may operate on application code, which may also be stored in memory 1110 to produce a deployable application enhanced for JDO persistence.

Computer system 1100 may further include other software and hardware components, such as an input/output (I/O) interface 1125, that may be coupled to various other components and memory 1110. The CPU 1120 may acquire instructions and/or data through the I/O interface 1025. Through the I/O interface 1125, the CPU 1120 may also be coupled to one or more I/O components. As illustrated, I/O components may include a hard disk drive 1130, a network adapter 1135, a display adapter 1140 and/or a removable storage adapter 1145. Some components 1130 to 1145 may be coupled to the I/O interface 1125. In addition, the computer system 1100 may include one or more of a particular type of component. The computer system 1100 may include one or more components coupled to the system through a component other than the I/O interface 1125. Some computer systems may include additional and/or other components such as application software (e.g., stored in memory 1110), other CPUs, video monitors or other displays, track balls, mice, keyboards, printers, plotters, scanners, or other types of I/O devices for use with computer system 1100.

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The flow charts described herein represent exemplary embodiments of methods. The methods may be implemented in software, hardware, or a combination thereof. The order of method may be changed, and various elements may be added, reordered, combined, omitted, modified, etc.

Various modifications and changes may be made to the invention as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

Various embodiments may further include receiving, sending or storing instructions and/or data implemented in accordance with the foregoing description upon a computer readable medium. Generally speaking, a computer readable medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The invention claimed is:

1. A system, comprising:
a processor; and
memory coupled to the processor and configured to store program instructions executable by the processor to implement a class structure based data object enhancer configured to:
input one or more classes;
analyze the structure of the one or more classes to determine a persistence structure specifying data fields of the one or more classes to be persisted; and
generate one or more enhanced classes corresponding to the one or more classes such that an object of the one or more enhanced classes is enhanced to persist data of the data fields to be persisted according to the persistence structure, wherein said data of the data fields to be persisted is data of said object; wherein the generation of each of said one or more enhanced classes comprises adding to the corresponding one of said one or more classes, one or more calls to persist data fields as specified by the persistence structure.

2. The system as recited in claim 1, wherein to analyze the structure of the one or more classes, the class structure based enhancer is configured to make one or more Java reflection calls to the one or more classes.

3. The system as recited in claim 1, wherein to analyze the structure of the one or more classes, the class structure based enhancer is configured to parse bytecode of the one or more classes to determine class and field attributes.

4. The system as recited in claim 1, wherein the class structure based enhancer is further configured to generate metadata that includes results of the analysis of the structure of the one or more classes.

5. The system as recited in claim 4, wherein the generated metadata is output explicitly as a metadata file.

6. The system as recited in claim 5, wherein the metadata file is an extensible markup language (XML) file.

7. The system as recited in claim 1, wherein the persistence structure corresponds to the structure of the one or more classes.

8. The system as recited in claim 1, wherein the persistence structure maps the data fields to be persisted to a single table in a database.

9. The system as recited in claim 1, wherein to determine a persistence structure for the data of the one or more classes the class structure based enhancer is configured to apply one or more rules to the results of Java reflection calls to or byte code parsing of the one or more input classes.

10. The system as recited in claim 9, wherein the one or more rules applied by the class structure based enhancer include persisting class fields that are not static or transient.

11. The system as recited in claim 9, wherein the one or more rules applied by the class structure based enhancer include storing persistent fields of a given class in a table corresponding to that class in a database.

12. The system as recited in claim 1, wherein the one or more classes are comprised in a Java ARchive (JAR) file.

13. The system as recited in claim 1, wherein the class structure based enhancer is further configured to output the enhanced one or more classes and a database schema for storing the data to be persisted in a persistent data store.

14. A computer-implemented method, comprising:
receiving one or more classes;
analyzing the structure of the one or more classes to determine a persistence structure specifying data fields of the one or more classes to be persisted; and
generating one or more enhanced classes corresponding to the one or more classes such that an object of the one or more enhanced classes is enhanced to persist data of the data fields to be persisted according to the persistence structure, wherein said data of the data fields to be persisted is data of said object; wherein generating each of said one or more enhanced classes comprises adding to the corresponding one of said one or more classes, one or more calls to persist data fields as specified by the persistence structure.

15. The method as recited in claim 14, wherein said analyzing comprises making one or more Java reflection calls to the one or more classes.

16. The method as recited in claim 14, wherein said analyzing comprises parsing bytecode of the one or more classes to determine class and field attributes.

17. The method as recited in claim 14, further comprising generating metadata that includes results of said analyzing.

18. The method as recited in claim 17, further comprising outputting the metadata explicitly as a metadata file.

19. The method as recited in claim 18, wherein the metadata file is an XML file.

20. The method as recited in claim 14, wherein the persistence structure corresponds to the structure of the one or more classes.

21. The method as recited in claim 14, wherein the persistence structure maps the data fields to be persisted to a single table in a database.

22. The method as recited in claim 14, wherein said determining of the persistence structure for the data of the one or more classes comprises applying one or more rules to the results of Java reflection calls to or byte code parsing of the one or more received classes.

23. The method as recited in claim 22, wherein the rules include persisting class fields that are not static or transient.

24. The method as recited in claim 22, wherein the rules include storing persistent fields of a given class in a table corresponding to that class in a database.

25. The method as recited in claim 14, wherein the one or more classes are comprised in a Java ARchive (JAR) file.

26. The method as recited in claim 14, further comprising outputting the enhanced one or more classes and a database schema for storing the Previously presented data to be persisted in a persistent data store.

27. A computer-accessible storage medium, storing program instructions, wherein the program instructions are computer-executable to:
   input one or more classes;
   analyze the structure of the one or more classes to determine a persistence structure specifying data fields of the one or more classes to be persisted; and
   generate one or more enhanced classes corresponding to the one or more classes such that an object of the one or more classes is enhanced to persist data of the data fields to be persisted according to the persistence structure, wherein said data of the data fields to be persisted is data of said object; wherein the generation of each of said one or more enhanced classes comprises adding to the corresponding one of said one or more classes, one or more calls to persist data fields as specified by the persistence structure.

28. The computer-accessible storage medium as recited in claim 27, wherein to analyze the structure of the one or more classes, the program instructions are executable to make one or more Java reflection calls to the input classes.

29. The computer-accessible storage medium as recited in claim 27, wherein to analyze the structure of the one or more classes, the program instructions are executable to parse bytecode of the one or more classes to determine class and field attributes.

30. The computer-accessible storage medium as recited in claim 27, wherein the program instructions are executable to generate metadata that includes results of the analysis of the structure of the one or more classes.

31. The computer-accessible storage medium as recited in claim 30, wherein the program instructions are executable to output the generated metadata explicitly as a metadata file.

32. The computer-accessible storage medium as recited in claim 31, wherein the metadata file is an extensible markup language (XML) file.

33. The computer-accessible storage medium as recited in claim 27, wherein the persistence structure corresponds to the structure of the one or more classes.

34. The computer-accessible storage medium as recited in claim 27, wherein the persistence structure maps the data fields to be persisted to a single table in a database.

35. The computer-accessible storage medium as recited in claim 27, wherein to determine a persistence structure for the data of the one or more classes the program instructions are executable to apply one or more rules to the results of Java reflection calls to or byte code parsing of the one or more input classes.

36. The computer-accessible storage medium as recited in claim 35, wherein the rules include persisting class fields that are not static or transient.

37. The computer-accessible storage medium as recited in claim 35, wherein the rules include storing persistent fields of a given class in a table corresponding to that class in a database.

38. The computer-accessible storage medium as recited in claim 27, wherein the one or more classes are comprised in a Java ARchive (JAR) file.

39. The computer-accessible storage medium as recited in claim 27, wherein the program instructions are executable to output the enhanced one or more classes and a database schema for storing the data to be persisted in a persistent data store.

* * * * *

UNITED STATES PATENT AND TRADEMARK OFFICE
CERTIFICATE OF CORRECTION

PATENT NO. : 7,720,877 B2
APPLICATION NO. : 10/824092
DATED : May 18, 2010
INVENTOR(S) : Ajay Kumar Page 1 of 1

It is certified that error appears in the above-identified patent and that said Letters Patent is hereby corrected as shown below:

On the title page, item (56), in column 2, under "Other Publications", line 3, delete "JDO" )," and insert -- JDO", --, therefor.

On sheet 6 of 7, in Figure 6, Box 630, line 1, delete "persistance" and insert -- persistence --, therefor.

In column 8, line 36, delete "$LineItem"/>" and insert -- $LineItem"/> --, therefor.

In column 13, line 3, in claim 26, after "the" delete "Previously presented".

Signed and Sealed this
Twenty-sixth Day of July, 2011

David J. Kappos
*Director of the United States Patent and Trademark Office*